(12) United States Patent
Bae et al.

(10) Patent No.: US 8,094,549 B2
(45) Date of Patent: Jan. 10, 2012

(54) APPARATUS AND METHOD FOR CLASSIFYING QUALITY-OF-SERVICE OF PACKET IN PORTABLE INTERNET SYSTEM

(75) Inventors: Hyung-Deug Bae, Daejeon (KR); Nam-Hoon Park, Daejeon (KR)

(73) Assignees: Samsung Electronics Co., Ltd (KR); Electronics and Telecommunications Research Institute (KR); KT Corporation (KR); SK Telecom Co., Ltd (KR); Hanaro Telecom., Inc. (KR)

(*) Notice: Subject to any disclaimer, the term of this patent is extended or adjusted under 35 U.S.C. 154(b) by 1188 days.

(21) Appl. No.: 11/603,498

(22) Filed: Nov. 21, 2006

(65) Prior Publication Data

US 2007/0127375 A1    Jun. 7, 2007

(30) Foreign Application Priority Data

Nov. 22, 2005   (KR) .................. 10-2005-0111593

(51) Int. Cl.
*H04L 12/26* (2006.01)
*H04L 12/56* (2006.01)

(52) U.S. Cl. .............................. 370/229; 370/395.21

(58) Field of Classification Search .......... 370/332, 370/338, 395.21, 395.3, 352, 389, 328, 329, 370/401, 229; 455/560, 452.2, 445
See application file for complete search history.

(56) References Cited

U.S. PATENT DOCUMENTS

| | | | |
|---|---|---|---|
| 6,463,082 B2 * | 10/2002 | Bergenwall et al. | 370/535 |
| H2051 H * | 11/2002 | Zhu et al. | 370/395.21 |
| 6,587,457 B1 | 7/2003 | Mikkonen | |
| 6,747,968 B1 * | 6/2004 | Seppala et al. | 370/338 |
| 7,006,472 B1 * | 2/2006 | Immonen et al. | 370/332 |
| 7,266,087 B2 * | 9/2007 | Wahl | 370/252 |
| 7,738,415 B2 * | 6/2010 | Chou | 370/328 |
| 7,835,365 B2 * | 11/2010 | Ayyagari | 370/395.3 |
| 7,961,736 B2 * | 6/2011 | Ayyagari | 370/395.3 |
| 2002/0174203 A1 * | 11/2002 | Kuhn et al. | 709/220 |
| 2003/0103454 A1 * | 6/2003 | Wahl et al. | 370/229 |
| 2004/0066783 A1 * | 4/2004 | Ayyagari | 370/395.3 |
| 2004/0082364 A1 * | 4/2004 | Kitazawa et al. | 455/560 |
| 2005/0030940 A1 * | 2/2005 | Abrol et al. | 370/352 |
| 2005/0198261 A1 * | 9/2005 | Durvasula et al. | 709/224 |
| 2006/0193286 A1 * | 8/2006 | Naghian et al. | 370/328 |
| 2007/0025243 A1 * | 2/2007 | Ayyagari et al. | 370/229 |

FOREIGN PATENT DOCUMENTS

| | | |
|---|---|---|
| KR | 1020030043649 A | 2/2003 |
| WO | 02/07388 | 1/2002 |

* cited by examiner

*Primary Examiner* — Hassan Kizou
*Assistant Examiner* — Emmanuel Maglo
(74) *Attorney, Agent, or Firm* — The Farrell Law Firm, P.C.

(57) ABSTRACT

In a portable Internet system, packets are classified into a first packet classified as a transport connection identifier (CID) and a second packet that is not classified as a transport CID by using an established packet classification rule. An application program of the second packet is searched from a plurality of application programs by using the header information of the second packet in the portable Internet system. QoS parameter information for the searched application program is obtained from a plurality of QoS parameter informations corresponding to the plurality of application programs.

18 Claims, 7 Drawing Sheets

FIG.6

| Program | Program path | QoS characteristic information |
|---|---|---|
| Wsftppro.exe | C:\Program Files\WS_FTP pro\wsftppto.exe | nrtPS... |
| Wmplayer.exe | C:\Program Files\Window Media layer\wmplayer.exe | rtPS... |
| ⋮ | ⋮ | ⋮ |

QoS characteristic information screen

[Add] [Delete] [Change] [Finish]

APPARATUS AND METHOD FOR CLASSIFYING QUALITY-OF-SERVICE OF PACKET IN PORTABLE INTERNET SYSTEM

BACKGROUND OF THE INVENTION (a) Field of the Invention

The present invention relates to a method for classifying a quality of service (QoS) for a packet in a portable Internet system.

(b) Description of the Related Art

A portable Internet system is an Internet protocol (IP)-based wireless communication network, and a terminal of the portable Internet system generates a time-sensitive voice over Internet protocol (VoIP) packet, real-time packet data corresponding to a video data stream, and non-real-time packet data including a web-browsing service. In the portable Internet, traffic for transmission includes four QoS classes. The four QoS classes are respectively categorized into an unsolicited grant service (UGS), a real-time polling service (rtPS), a non real-time polling service (nrtPS), and a best effort (BE) service.

The UGS supports real-time transmission of small size packets such as a voice over Internet Protocol (VoIP), and the rtPS supports transmission of variable size packets such as a moving picture experts group (MPEG) video on a periodic basis. In addition, the nrtPS supports transmission of variable size data bursts (e.g., a file transfer protocol, FTP), and the BE service supports transmission of traffic having lower priority such as e-mail and web-browsing. The above-noted service grades are combined with QoS parameters such as a traffic rate, a jitter, a maximum latency, and an error rate, and associated with a specific transport connection. That is, the transport connection is associated with one of the QoS grades. A plurality of transport connections may be established between a terminal and a base station depending on QoS, and each transport connection can be identified by a connection identifier (CID).

Packet data between the terminal and the base station in the portable Internet system can be communicated through the transport connection established in a medium access control (MAC) layer. specifies connection-oriented access methods. In addition, mapping of an IP packet to a transport CID is designed to be performed through a packet classifier.

The packet classifier classifies packet data into a transport CID of the MAC layer by using the header information of the IP packet transmitted from an upper layer. The terminal needs an uplink packet classifier to classify uplink IP packets toward the base station, and the base station needs a downlink packet classifier to classify downlink IP packets toward the terminal.

The packet classifier defines a plurality of classification rules for classifying IP packet into a transport CID, and the classification rules are composed by a combination of IP header information including a type of service, a destination address, a source address, a destination port number, a source port number, and a protocol type. A packet classifier is connected with only one CID. Thus, in the portable Internet system, an IP packet is classified into a transport CID having a specific QoS class by the packet classifier and then transmitted. Therefore, an application having a real-time service parameter must be mapped to a transport CID having the same QoS class (i.e., real-time service) and a packet classification rule of a packet classifier must be accurately established such that the application can be served with real-time services.

A process for generating a packet classification rule is the same as that of a service flow of a MAC layer. The service flow is generated, changed, and deleted through standardized processes such as a dynamic service add (DSA) process, a dynamic service change (DSC) process, and a dynamic service delete (DSD) process. In the DSA process, QoS parameter and a packet classification rule are transmitted between the mobile station and the base station. The mobile station and the base station generate uplink/downlink packet classifiers and uplink/downlink CIDs by exchanging the QoS parameter and the packet classification rule.

However, it is difficult to identify a QoS class of IP packet. In a conventional bi-directional communication network it is not designed to classify the QoS parameters of IP packet, and the terminal and the base station transmit identically the IP packets by a first-in-first-out (FIFO) method even though the IP packets have different QoS classes.

On the other hand, an application program may insert QoS class information into a specific field of IP header for classification of IP packet. However, this method also has problems of developing an application dedicated to a portable Internet service and accordingly the application becomes incompatible with other typical applications.

The Internet Assigned Number Authority (IANA), an international Internet standardization organization, assigns a well-known port number for an application such that a client program accesses a server by using the well-known port number. For example, a file transfer protocol (FTP) uses port 21, specifying transmission control protocol (TCP) or user control point (UCP) as a transport protocol, and a packet having the same protocol type and port number as above may have the same QoS as that of the FTP. However, it could be inaccurate to classify packets by using the protocol type and port number when substantial traffic data is transmitted/received because the protocol type and port number are used when the client initially accesses the server and they may be dynamically changed after the initial access.

According to another method, forming the IP address of an Internet server and a characteristic of service as a classification rule can be a candidate solution. However, this method also has problems of difficulty due to variation of the IP address and inefficiency of managing addresses of all existing Internet servers.

The above-state methods cannot solve the problems such as how to identify a QoS class of IP packet and how to generate a classification rule of the packet. Accordingly, a method for identifying a QoS grade of IP packet and generating a classification rule is needed.

SUMMARY OF THE INVENTION

The present invention has been made in an effort to provide a device and a method for identifying a quality of service (QoS) class of Internet protocol (IP) packet in a portable Internet system, generating a packet classification rule so as to obtain QoS parameter from the IP packet, and creating or changing a transport connection identifier (CID) by combining the obtained QoS parameter and the packet classification rule.

According to one aspect of the present invention, a device for classifying a quality of service (QoS) for a packet in a portable Internet system is provided. The device includes a packet classification unit, a QoS information storage unit, a program search unit. The packet classification unit classifies the packet into a first packet classified as at least one transport connection identifier (CID) and a second packet that is not classified as at least one transport CID by using at least one established packet classification rule. The QoS information storage unit stores a plurality of pairs of application program name and QoS parameter information of the respective application program. The program search unit searches the application program name of the second packet from a plurality of application programs by using header information of the second packet. The QoS information management unit obtains QoS parameter information of the second packet from the data stored in the QoS information storage unit by using the application program name searched by the program search unit.

According to another aspect of the present invention, a method for classifying a quality of service (QoS) for a packet in a portable Internet system is provided. The method includes classifying the packet into a first packet classified as a transport connection identifier (CID) and a second packet that is not classified as a transport CID by using an established packet classification rule. The method further includes searching an application program of the second packet from a plurality of application programs by using the header information of the second packet; and obtaining a QoS parameter information for the searched application program from a plurality of QoS parameter informations corresponding to the plurality of application programs.

According to yet another aspect of the present invention, a device for classifying a quality of service (QoS) for a packet is provided. The device includes a means for using at least one packet classification rule to classify at least one first packet among a plurality of packets; and a means for obtaining QoS parameter information of at least one second packet that is not classified according to at least one packet classification rule.

BRIEF DESCRIPTION OF THE DRAWINGS

FIG. 6 shows a diagram representing a screen display of the QoS parameter information according to the exemplary embodiment of the present invention.

DETAILED DESCRIPTION OF THE EMBODIMENTS

Figure 1:
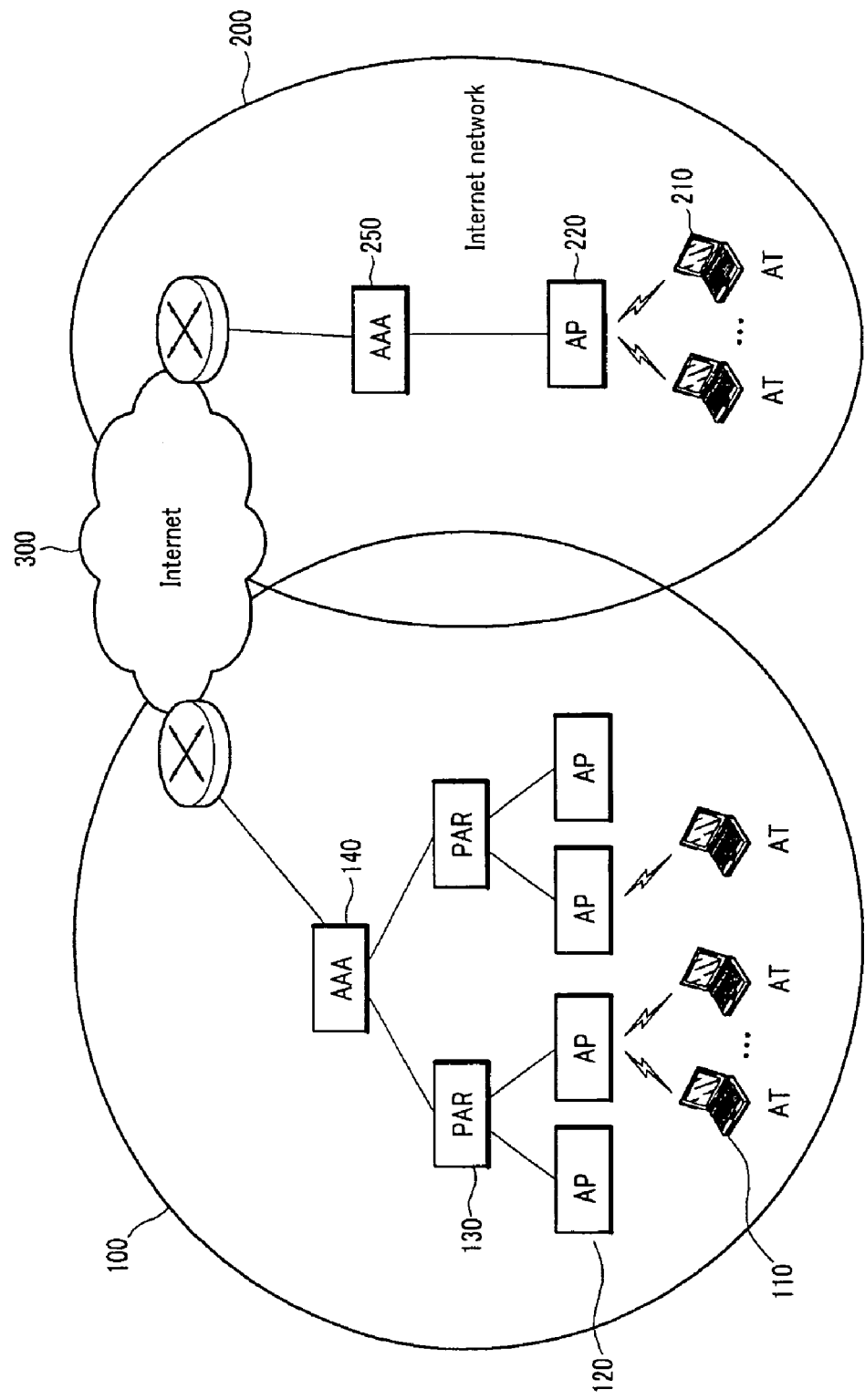
FIG. 1 shows a diagram representing a portable Internet system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, each block will be understood to indicate a unit for processing a predetermined function or operation, which may be realized by hardware, software, or a combination thereof.

A portable Internet system according to an exemplary embodiment of the present invention will be described with reference to FIG. 1.

FIG. 1 shows a diagram representing a portable Internet system according to the exemplary embodiment of the present invention.

As shown in FIG. 1, the portable Internet system according to the exemplary embodiment of the present invention includes an access terminal (AT) 110, an access point (AP) 120, a packet access router (PAR) 130, and an authentication, authorization, and accounting (AAA) server 140.

The AT 110 having mobility is used by a subscriber to receive a portable Internet service, and performs a radio channel transmitting/receiving function according to a radio access standard to access the AP 120. For example, the AT 110 may use a 2.3 GHz band frequency.

The AP 120 connects a wireless network and a wired network, and provides a wireless packet data service to the AT 110 from an end of the wired network through a wireless interface. That is, the AP 120 performs an initial access function, a handover control function between cells, a quality of service (QoS) control function, and so on. In addition, the AP 120 receives a wireless signal from the AT 110 and transmits it to the PAR 130, or the AP 120 receives information from the PAR 130, converts it into a wireless signal, and transmits the signal to the AT 110.

The PAR 130 connects a plurality of APs 120 based on the Internet protocol (IP), controls the AP 120 and the AT 110, performs a routing operation for IP packet, and performs a foreign agent function for the mobile IP. An area of the PAR 130 corresponds to an IP subnet. The foreign agent function performs a user registration and a user deregistration function so that the AT 110 moves to another service network while maintaining an Internet access by providing packet based internet access and roaming service.

The AAA server 140 accesses the PAR 130 through an Internet 300 and performs authentication, authorization, and accounting functions for a user and the AT 110 to provide service to a registered user. In addition, the AAA server 150 uses a diameter protocol standardized by the Internet Engineer Task Force (IETF), which is an international standard organization. Authentication, authorization, and accounting information between servers may be transmitted through the diameter protocol.

The portable Internet system 100 shown in FIG. 1 may interwork with an Internet network 200 including an access terminal 210, an access point 220, and an AAA server 250, a cellular network, or a wireless local area network (LAN) through the Internet 300, and one network may include one or more PARs 130. In addition, one PAR 130 may include one or more APs 120, and a plurality of the ATs 110 are connected to one AP 120 to receive a service. When the AT 110 moves from a cell covered by the AP 120 to another cell, the AT 110 may receive the service provided by the cell covered by the AP 120.

Figure 2:
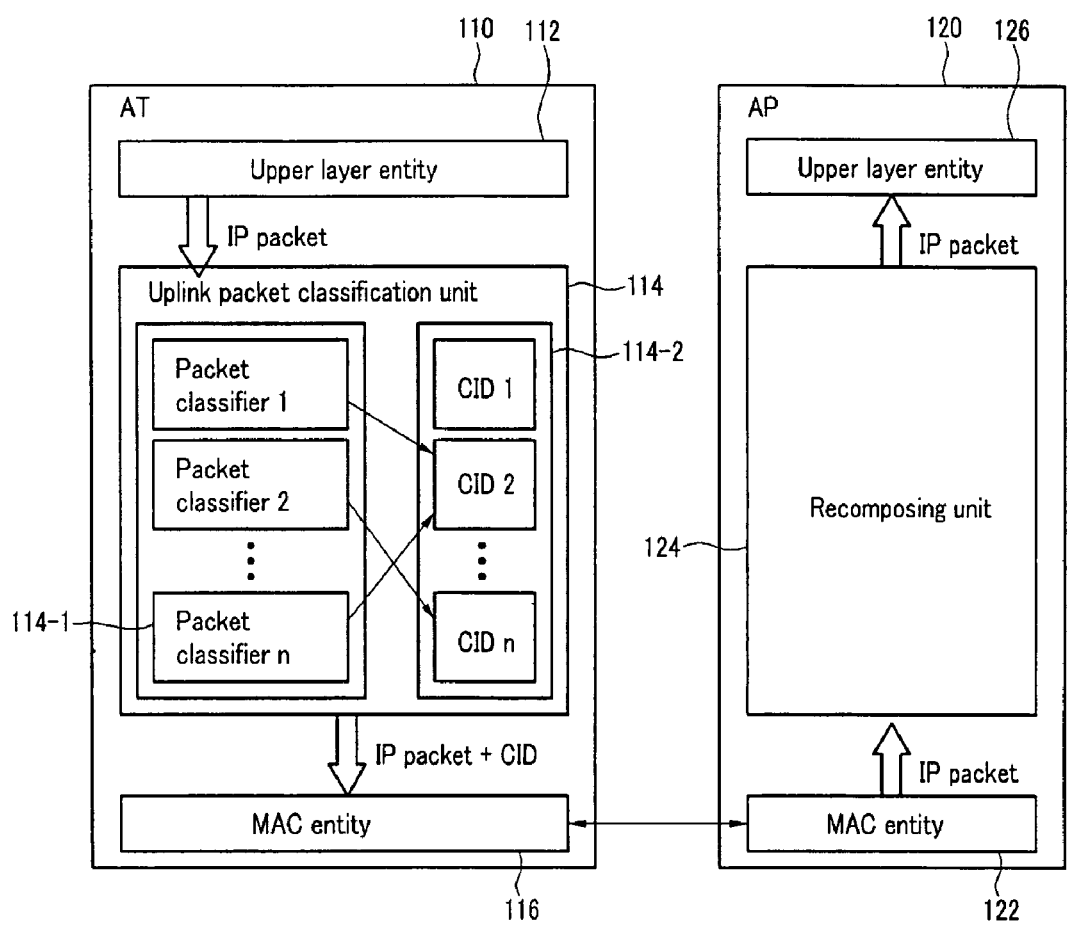
FIG. 2 shows a diagram representing a mapping process of a packet classifier and a transport connection identifier (CID) for packets transmitted from an access terminal to an access point in the portable Internet system according to the exemplary embodiment of the present invention.

FIG. 2 shows a diagram representing a mapping process of packet classifiers and transport connection identifiers (CID) for IP packets transmitted from the AT to the AP in the portable Internet system.

As shown in FIG. 2, the AT 110 includes an upper layer entity 112, an uplink packet classification unit 114, and a medium access control (MAC) entity 116, and the AP 120 includes a MAC entity 122, a recomposing unit 124, and an upper layer entity 126. In the following description, the upper layer entities 112 and 126 and the MAC entities 118 and 122 of the AT 110 and the AP 120 are respectively referred to as an AT upper layer entity 112, an AT MAC entity 116, an AP upper layer entity 126, and an AP MAC entity 122 to make a distinction therebetween. In addition, uplink IP packets transmitted from the AT 110 to the AP 120 and downlink IP packets transmitted from the AP 120 to the AT 110 are respectively referred to as the uplink IP packet and the downlink IP packet.

The AT upper layer entity 112 performs a distribution process and information exchange in four upper layers (a network layer, a session layer, a presentation layer, and an application layer) of open system interconnection (OSI) 7 layers, and processes IP packets generated from an application of the AT 110. The AT upper layer entity 112 corresponds to the AP upper layer entity 126 of the AP 120 that communicates with the AT 110, and accordingly, the AP upper layer entity 126 receives, analyzes, and processes distribution processing data and information exchange data generated from the AT upper layer entity 112 and the IP packets generated from the application of the AT 110.

The uplink packet classification unit 114 includes a plurality of packet classifiers 114-1 respectively having own classification rules and a plurality of transport CIDs 114-2 respectively corresponding to the classification rules of the respective packet classifiers 114-1. The uplink packet classification unit 114 classifies uplink packet data transmitted from the AT upper layer entity 112 into an uplink transport CID according to classification rules of a plurality of uplink packet classifiers 114-1, and transmits the uplink packet data and the classified transport CID information to the AT MAC entity 116. The rules of the uplink packet classifier 114-1 are formed by a combination of IP header information that includes a destination address, a source address, a destination port number, a source port number, and a protocol type.

The AT MAC entity 116 transmits the received uplink IP packet to the AP MAC entity 122 through an uplink transport CID assigned by the uplink packet classifiers 114-1.

The AP MAC entity 122 receives the uplink IP packet from the AT MAC entity 116 and delivers the same to the recomposing unit 124.

The recomposing unit 124 recomposes the received uplink IP packet and transmits recomposed IP packet to the AP upper layer entity 126.

The AP upper layer entity 126 analyzes and executes the recomposed uplink IP packet.

Similar to the uplink IP packet transmission from the AT 110 to the AP 120 described in the above-stated embodiment, a downlink IP packet transmitted from the AP 120 to the AT 110 may be classified. That is, the downlink IP packet generated in the application of the AP is classified into a downlink transport CID by using a downlink packet classifier and is transmitted through the downlink transport CID, and the AT 110 recomposes the downlink IP packet, and the AT upper layer entity 112 analyzes and executes the recomposed IP packet to.

Figure 3:
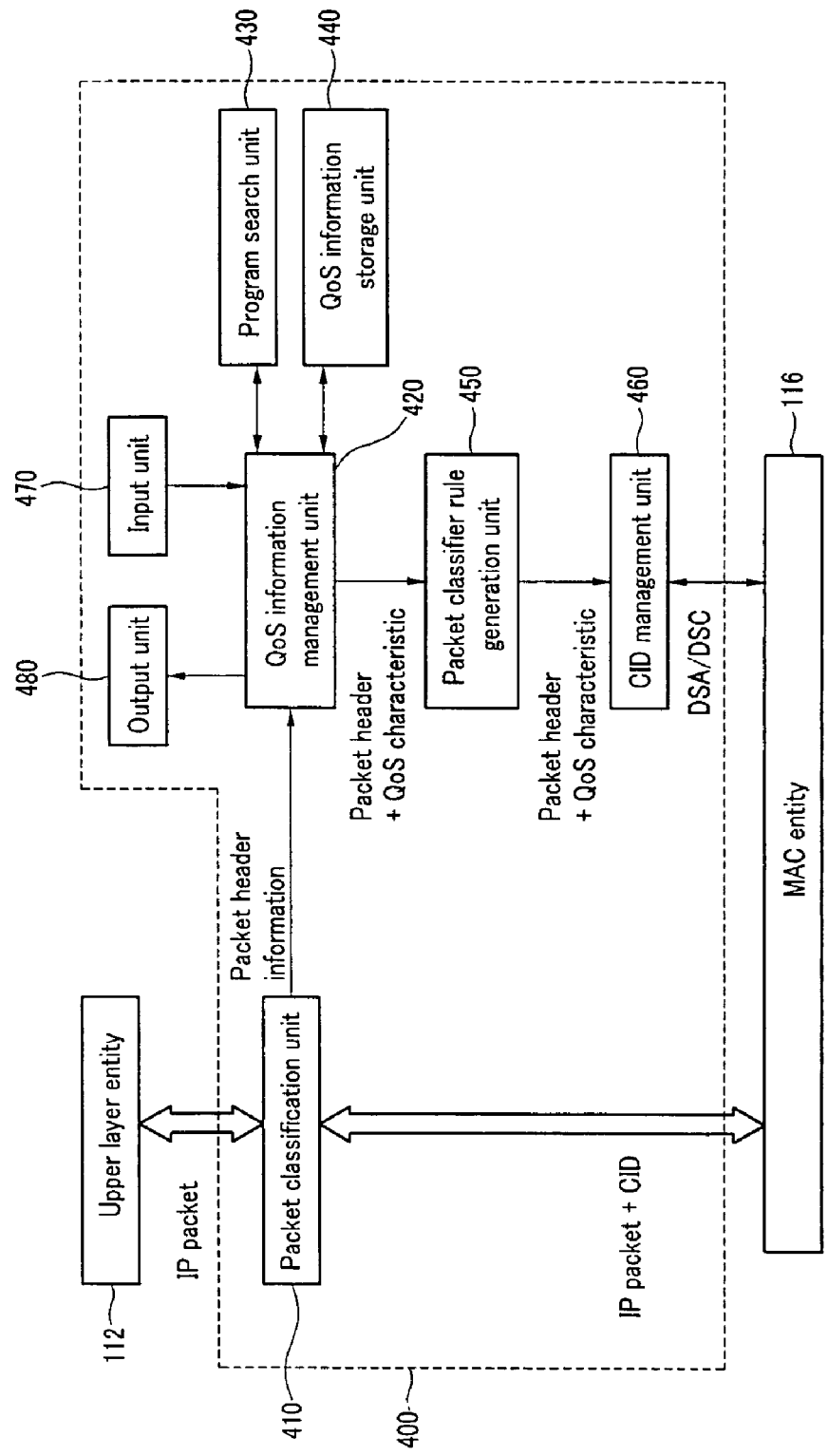
FIG. 3 shows a diagram representing a device for classifying a QoS grade of IP packet in the portable Internet system according to the exemplary embodiment of the present invention.

FIG. 3 shows a diagram representing a device for classifying a QoS grade of IP packet in the portable Internet system according to the exemplary embodiment of the present invention.

As shown in FIG. 3, the device 400 according to the exemplary embodiment of the present invention includes a packet classification unit 410, a QoS information management unit 420, a program search unit 430, a QoS information storage unit 440, a packet classifier rule generation unit 450, a CID management unit 460, an input unit 470, and an output unit 480.

The packet classification unit 410 includes the uplink packet classification unit 114 shown in FIG. 2. Additionally the packet classification unit 410 performs a function for classifying the downlink IP packet. That is, the packet classification unit 410 includes the uplink packet classifiers, the downlink packet classifiers, a plurality of uplink transport CIDs, and a plurality of downlink transport CIDs, and performs a function for classifying the uplink/downlink IP packets. Since the function for classifying the downlink IP packet is to obtain the QoS parameter of the downlink IP packet, it is different from a packet classification function for mapping the downlink transport CID by the AP 210, and an uplink IP packet classification process is performed in similar manner to the uplink packet classification unit 114 shown in FIG. 2.

In further detail, when receiving uplink IP packet from the AT upper layer entity 112, the packet classification unit 410 classifies the uplink packet to a specific uplink transport CID by using the uplink packet classification classifiers 114-1. When receiving downlink IP packet from the AT MAC entity 116, the packet classification unit 410 performs the same function as the recomposing unit 124 of the AP 120 shown in FIG. 2, and transmits the recomposed downlink IP packet to the AT upper layer entity 112. In addition, the packet classification unit 410 copies a header of the downlink IP packet, and classifies the downlink IP packet by using the downlink packet classifiers (not shown). When the uplink or downlink IP packet is unclassifiable to a specific transport CID, the packet classification unit 410 delivers the header information of the uplink or downlink IP packet to the QoS information management unit 420.

The QoS information management unit 420 delivers the header information of the uplink or downlink packet that cannot be classified to the specific transport CID to the program search unit 430. In response to the header information, the QoS information management unit 410 receives the name of an application program transmitting the unclassifiable uplink or downlink IP packet from the program search unit 430, and requests the QoS information storage unit 440 storing the QoS parameter information to search the QoS parameter information of the application program by delivering the name of the application program. The QoS information management unit 410 delivers the header information of the uplink or downlink IP packet and the obtained QoS parameter information to the packet classifier rule generation unit 450. However, when the QoS parameter information is not searched, the QoS information management unit 410 establishes the QoS parameter of the uplink or downlink IP packet to be a best-effort (BE) grade that is a basic QoS grade, and delivers the established QoS parameter along with the header information of the unclassifiable packet to the packet classifier rule generation unit 450. In addition, the QoS information management unit 420 is associated with the input unit 470 and the output unit 480, transmits a user command transmitted form the input unit 470 to the QoS information storage unit 440, and transmits a result of the user command to a user through the output unit 480.

The program search unit 430 receives the uplink or downlink packet header information from the QoS information management unit 420, extracts the protocol type and the port number, searches application programs by using the corresponding protocol and port number, and transmits them to the QoS information management unit 420.

The QoS information storage unit 440 stores application program name, application program path, and QoS parameter information of the application program.

The packet classifier rule generation unit 450 receives the header information of the uplink or downlink IP packet from the QoS information management unit 420, generates a packet classification rule by using the header information of the IP packet, and transmits the generated packet classification rule along with the QoS parameter information to the CID management unit 460.

The CID management unit 460 starts and terminates the DSA or DSC protocol processes, combines the packet classification rule and the obtained QoS parameter information, and generates a new transport CID or changes the transport CID.

The input and output units 470 and 480 provide inputs and outputs function for a user. The user may search, change, add, and delete an application program and its QoS information in the QoS information storage unit 440 through the input unit 470 and the output unit 480. That is, the input unit 470 receives requests for searching, changing, adding, and deleting the application program and its QoS information stored in the QoS information storage unit 440 from the user. The output unit 480 outputs results of the requests for searching, changing, adding, and deleting the information stored in the QoS information storage unit 440 to the user.

Figure 4:
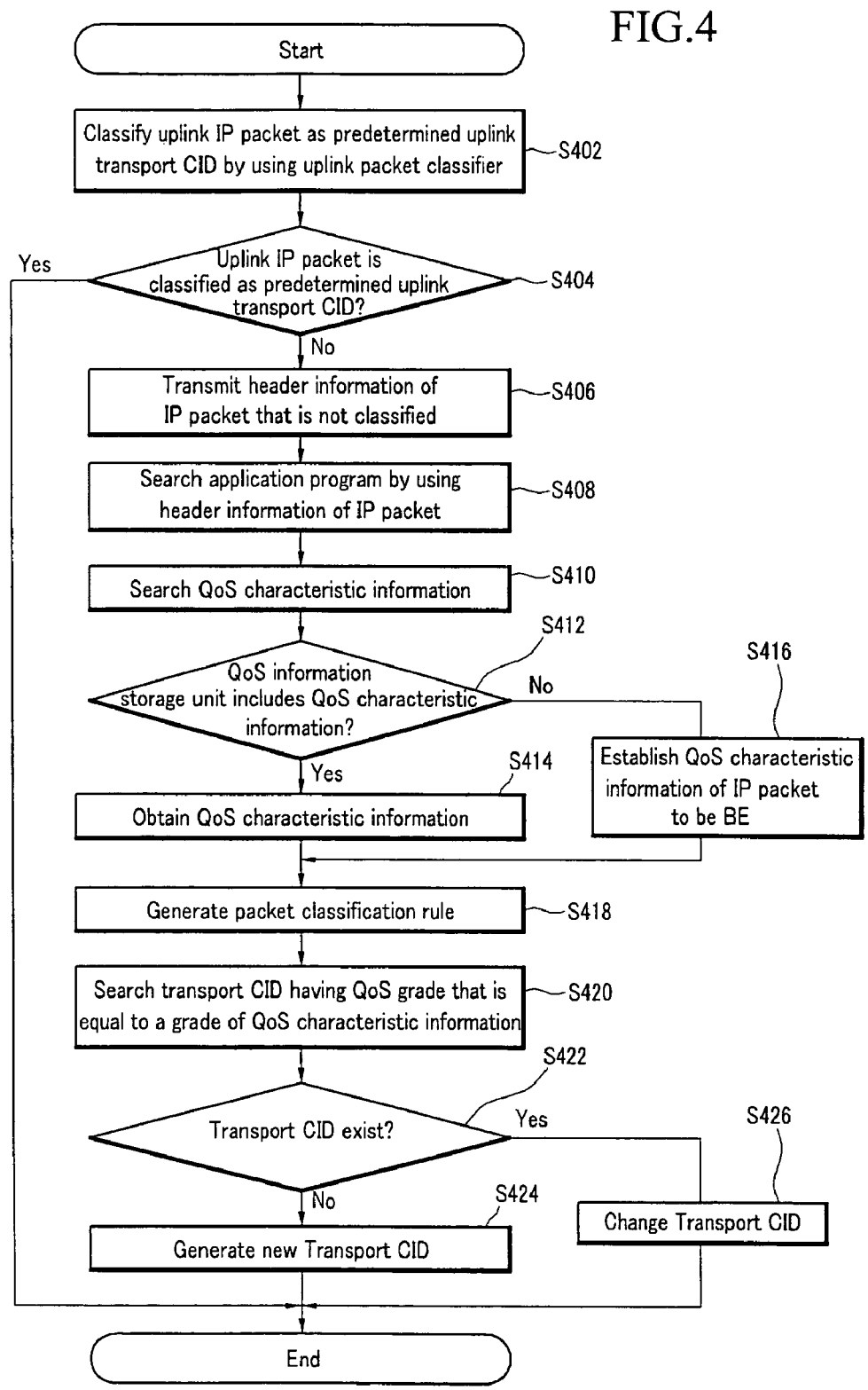
FIG. 4 shows a flowchart representing an operation of a device for classifying a QoS grade of IP packet in the portable Internet system according to the exemplary embodiment of the present invention.

FIG. 4 shows a flowchart representing an operation of the device for classifying a QoS grade of IP packet in the portable Internet system according to the exemplary embodiment of the present invention.

As shown in FIG. 4, the packet classification unit 410 classifies the uplink IP packet into a specific uplink transport CID by using the uplink packet classifiers in step S402. When the uplink IP packet is classified into the transport CID in step S404, the AT MAC entity 116 is requested by the packet classification unit 410 to transmit the uplink IP packet through a classified uplink transport CID. However, when the uplink IP packet is not classified into a transport CID, the header information of the uplink packet is transmitted to the QoS information management unit 420 in step S406.

On the other hand, the packet classification unit 410 copies a header of the downlink IP packet, classifies the downlink IP packet into a downlink transport CID by using the downlink packet classifiers (not shown) in step S402. When the downlink IP packet is classified into a transport downlink CID, the downlink IP packet is ignored. However, when the downlink IP packet is not classified into a transport downlink CID, the header information of the downlink IP packet is delivered to the QoS information management unit 420 in step S404 and S406.

In step S408, the QoS information management unit 420 transmits the header information of the unclassifiable uplink or downlink IP packet to the program search unit 430, the program search unit 430 searches an application program name by using the transmitted header information of the uplink or downlink IP packet, and transmits the name of the application program to the QoS information management unit 420. In step S410, the QoS information management unit 420 searches the QoS grade information of the corresponding application program by using the received application program name in the data stored in the QoS information storage unit 440. In step S412, it is determined by the QoS information management unit 420 whether the QoS parameter information of the corresponding application program does exist or not in the QoS information storage unit 440. When the QoS parameter information of the corresponding application program does exist, it proceeds to step S414. In step S414, the QoS parameter information of the corresponding application program is obtained by the QoS information management unit 420, the header information of the uplink or downlink IP packet and the obtained QoS parameter information are transmitted to the packet classifier rule generation unit 450. However, in step S412, when the QoS parameter information of the corresponding application program does not exist, it proceeds to step S416. In step S416, the QoS parameter of the uplink or downlink IP packet are established to be the BE grade that is the basic QoS grade, are delivered to the packet classifier rule generation unit 450 along with the header information of the uplink or downlink IP packet. The above process may be performed by execution codes of a central processing unit without a user's operation.

In step S418, the packet classifier rule generation unit 450 generates a new packet classification rule from the header information of the uplink or downlink IP packet, delivers the generated packet classification rule along with the QoS parameter information to the CID management unit 460. In step S418, the uplink packet classification rule includes the destination address, the destination port number, and the protocol type, and the downlink packet classifier rule includes the address, a source address, a source port number, and the protocol type.

In step S420 and S422, The CID management unit 460 searches a transport CID having the same QoS grade as the QoS grade transmitted from the packet classifier rule generation unit 450. When there is no transport CID having the same QoS grade as the QoS parameter information transmitted from the packet classifier rule generation unit 450, the AT MAC entity is requested by the CID management unit 460 to start a DSA process. The DSA process is performed to generate a new transport CID by combining the packet classification rule generated by the packet classifier rule generation unit 450 and the QoS parameter information in step S424. However, in step S420 and S422, when there is the transport CID having the same QoS grade as the QoS parameter information transmitted from the packet classifier rule generation unit 450, the AT MAC entity is requested by the CID management unit 460 to start a DSC process which is performed for adding the packet classification rule to the transport CID having the same QoS grade in step S426.

Figure 5:
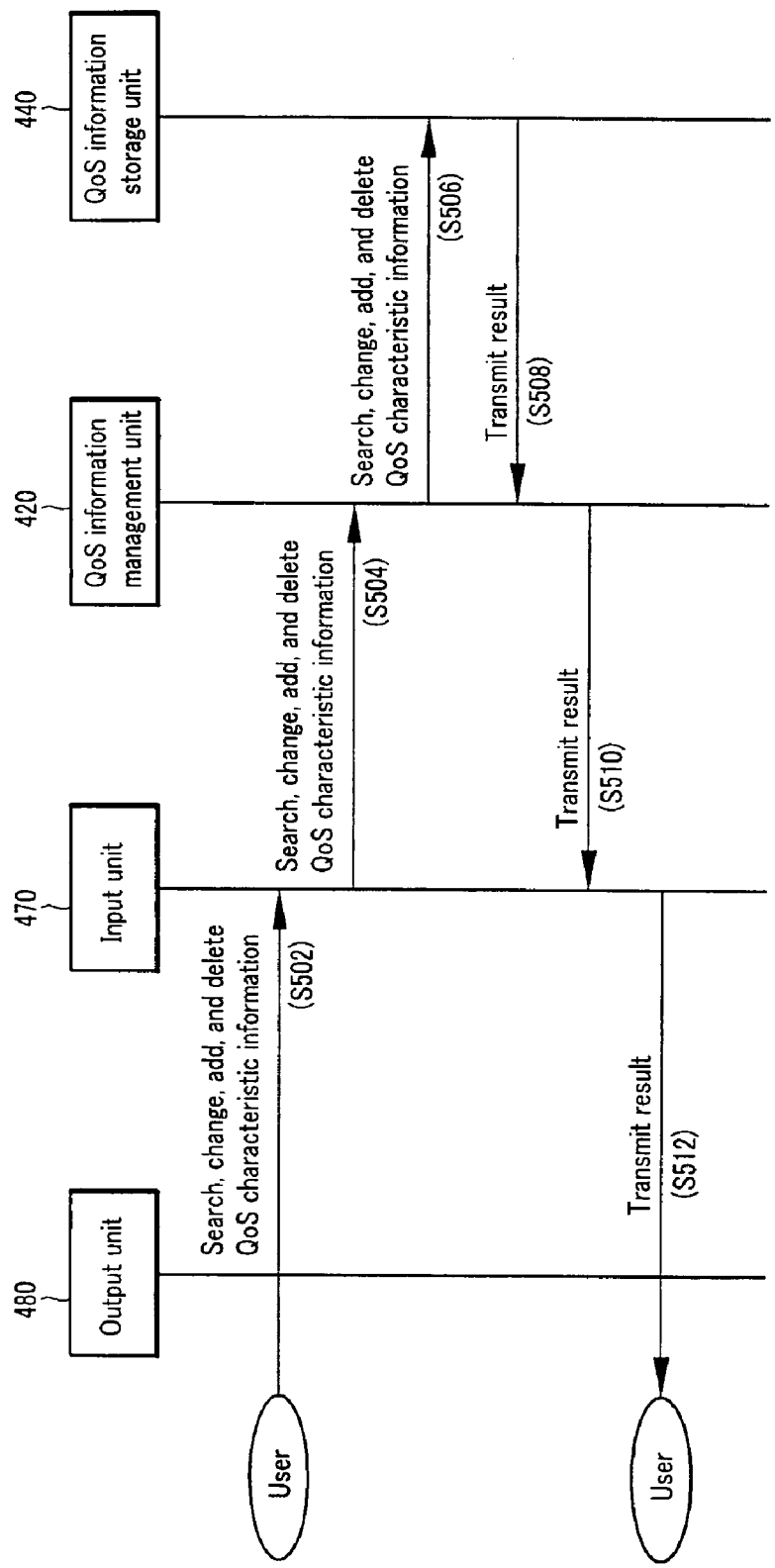
FIG. 5 shows a diagram representing a management procedure of the QoS parameter information of the device for classifying the QoS grade of IP packet in the portable Internet system according to the exemplary embodiment of the present invention.

FIG. 5 shows a diagram representing a management procedure of the QoS parameter information of the device for classifying the QoS grade of IP packet in the portable Internet system according to the exemplary embodiment of the present invention.

As shown in FIG. 5, the input unit 470 receives a command for searching, changing, adding, and deleting the QoS parameter information from the user in step S502, and delivers the command to the QoS information management unit 420 in step S504. The QoS information management unit 420 searches, changes, adds, or deletes the QoS parameter information in the QoS information storage unit 440 according to the command in step S506, and the QoS information management unit 440 responds a result of the command to the user through the output unit 480 in steps S508, S510, and S512.

FIG. 6 shows a diagram representing a screen display of the QoS parameter information of an application program according to the exemplary embodiment of the present invention.

As shown in FIG. 6, when receiving the command for searching the QoS parameter information from a user, the QoS information management unit 420 outputs the application program name, path, and QoS parameter information stored in the QoS information storage unit 440 through the QoS information searching screen. In addition, the user may use an "add" button of the QoS information searching screen to additionally store a new application program and its QoS parameter information in the QoS information storage unit 440, and may use a "delete" button to delete the selected information from the QoS information storage unit 440. Further, the user may use the "change" button to change the QoS parameter information of an application program stored in the QoS information storage unit 440, may use a "finish" button to finish the application program.

Figure 7:
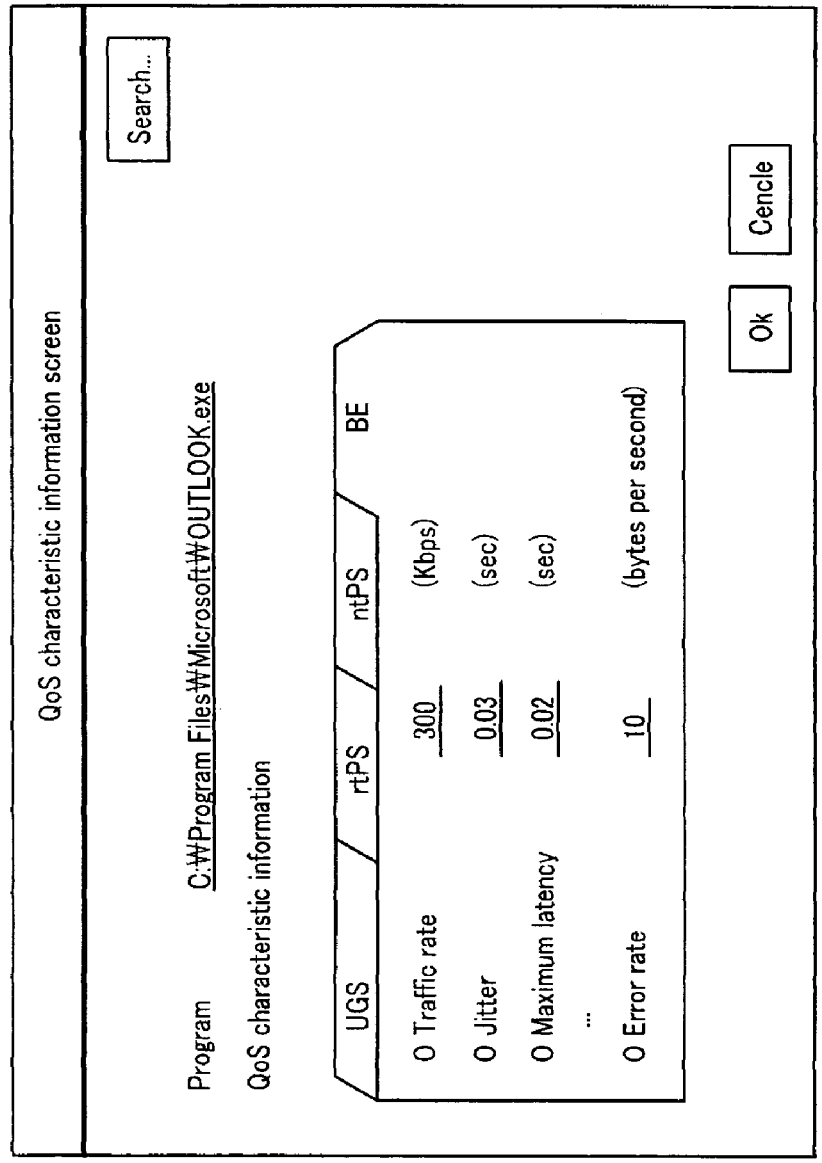
FIG. 7 shows a diagram representing a screen display of an output unit when an "add" button is clicked in the QoS parameter information screen display shown in FIG. 6.

FIG. 7 shows a diagram representing a screen display of an output unit when an "add" button is clicked in the QoS parameter information screen display shown in FIG. 6.

In FIG. 7, the name of the application program represents a path of an application program to be added. The QoS parameter information, provides a plurality of QoS grades (e.g., four grades including unsolicited grant service (UGS), a real-time polling service (rtPS), a non-real-time polling service (nrtPS), and a best-effort (BE) service that are defined in a portable Internet standard), and an user may select one of the QoS grades for an application program. In addition, when the user selects the QoS parameter information, default QoS parameter values are displayed. The user may change the default QoS parameter value. The QoS parameter values include a traffic rate, a jitter, a maximum latency, and an error rate.

According to the exemplary embodiment of the present invention, since the portable Internet provides a method for obtaining the QoS parameters of the IP packet, a difficulty in detecting the QoS grade from the IP packet may be solved, a packet may be precisely classified, and a differentiated service between the access terminal and the access point may be provided.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for classifying a quality of service (QoS) for a packet in a portable Internet system, the device comprising:
   a packet classification unit for classifying the packet into a first packet corresponding to at least one transport connection identifier (CID) and a second packet that is not corresponding to at least one transport CID by using at least one established packet classification rule;
   a QoS information storage unit for storing a plurality of pairs of application program name and QoS parameter information of the respective application program;
   a program search unit for searching the application program name of the second packet from a plurality of application programs by using header information of the second packet;
   a QoS information management unit for obtaining QoS parameter information of the second packet from the data stored in the QoS information storage unit by using the application program name searched by the program search unit;
   a packet classifier rule generation unit for generating a new packet classification rule by using the header information of the second packet, and
   a CID management unit for changing at least one transport CID or generating a new transport CID by combining the new packet classification rule and the QoS parameter information.

2. The device of claim 1, wherein the QoS parameter information comprises information on a service grade defined in the portable Internet system.

3. The device of claim 1, wherein the packet classification unit comprises:
   at least one uplink packet classifier defining the packet classification rule for an uplink packet among the at least one packet classification rule;
   at least one downlink packet classifier defining the packet classification rule for a downlink packet among at least one packet classification rule;
   at least one first transport CID corresponding to the uplink packet classifier among the at least one transport CID; and
   at least one second transport CID corresponding to at least one downlink packet classifier among the at least one transport CID.

4. The device of claim 1, wherein, when the QoS information management unit does not obtain the QoS parameter information of the second packet from the QoS information storage unit, the QoS information management unit establishes the QoS parameter information of the second packet to be a basic grade.

5. The device of claim 1, wherein the program search unit uses a protocol type and a port number in the header information of the second packet to search the application program.

6. The device of claim 1, further comprising:
   an input unit for receiving requests searching, adding, changing, and deleting the information stored in the QoS information storage unit from; and
   an output unit for outputting results of the requests for searching, changing, adding, and deleting the information stored in the QoS information storage unit.

7. The device of claim 1, wherein the QoS parameter information comprises:
   an unsolicited grant service grade for transmitting small data;
   a real-time polling service grade for data having a cyclically variable size;
   a non-real-time polling service for data having a variable size; and
   a best effort service grade for data of low priority.

8. The device of claim 4, wherein the basic grade comprises a best effort service grade.

9. A method for classifying a quality of service (QoS) for a packet in a portable Internet system, the method comprising:
   classifying the packet into a first packet corresponding to a transport connection identifier (CID) and a second packet that is not corresponding to a transport CID by using an established packet classification rule;
   searching an application program of the second packet from a plurality of application programs by using the header information of the second packet;

obtaining a QoS parameter information for the searched application program from a plurality of QoS parameter information corresponding to the plurality of application programs;

generating a new packet classification rule by using the header information of the second packet; and changing at least one transport CID or generating a new transport CID by combining the obtained QoS parameter information and the new packet classification rule.

10. The method of claim 9, wherein the QoS parameter information comprises information of a service grade defined in the portable Internet system.

11. The method of claim 9, further comprising, when a QoS parameter information for the searched application program does not exist, establishing the QoS parameter of the second packet to be a basic grade among service grades defined in the portable Internet system.

12. The method of claim 9, wherein the packet comprises an uplink packet and a downlink packet.

13. The method of claim 9, further comprising:

receiving requests for searching, adding, changing, and deleting the QoS parameter information of the plurality of application programs from a user; and searching, adding, changing, and deleting the QoS parameter information of the plurality of application programs.

14. The method of claim 12, wherein the new packet classification rule comprises:

an uplink packet classification rule comprising a destination address, a destination port number, and a protocol type; and a downlink packet classification rule for the downlink packet comprising the destination address, a source address, a source port number, and the protocol type.

15. A device for classifying a quality of service (QoS) for a packet in a portable Internet system, the device comprising:

a means for using at least one packet classification rule to classify at least one first packet among a plurality of packets into one or more transport Connection Identifiers (CIDs);

a means for obtaining QoS parameter information of at least one second packet that is not classified according to at least one packet classification rule; and a means for changing one of the one or more transport CIDs or generating a new transport CID by combining a newly generated packet classification rule for the at least one second packet and the obtained QoS parameter information.

16. The device of claim 15, wherein the QoS parameter information comprises information of a service grade defined in the portable Internet system.

17. The device of claim 15, further comprising a means for using header information of the at least one second packet to search an application program for the at least one second packet from a plurality of application programs, wherein the QoS parameter information of the at least one second packet corresponds to the QoS parameter information of the searched application program.

18. The device of claim 15, further comprising a means for establishing the QoS parameter information of the second packet to be a basic grade when the QoS parameter information of the at least one second packet is not obtained.

\* \* \* \* \*